United States Patent [19]

Tsuyuguchi et al.

[11] Patent Number: 4,700,243
[45] Date of Patent: Oct. 13, 1987

[54] POWER SAVING CIRCUIT ARRANGEMENT FOR AN APPARATUS FOR DATA TRANSFER WITH FLEXIBLE MAGNETIC DISK OR THE LIKE

[75] Inventors: Hiroshi Tsuyuguchi, Tokyo; Tsutomu Morita, Musashino; Makoto Shoji, Fussa, all of Japan

[73] Assignee: Teac Corporation, Tokyo, Japan

[21] Appl. No.: 634,320

[22] Filed: Jul. 25, 1984

[30] Foreign Application Priority Data

Jul. 29, 1983 [JP] Japan ................... 58-139699

[51] Int. Cl.⁴ ............... G11B 19/00; G11B 19/02; G11B 21/02
[52] U.S. Cl. ................... 360/69; 360/99; 360/75; 360/60
[58] Field of Search .......... 360/69, 71, 75, 97, 360/98, 99, 86, 137, 93, 60, 61; 364/184, 707, 200 MS File, 900 MS File

[56] References Cited

U.S. PATENT DOCUMENTS

| | | | |
|---|---|---|---|
| 3,678,481 | 7/1972 | Dalziel et al. | 360/99 |
| 3,956,740 | 5/1976 | Jones et al. | 360/69 |
| 4,089,029 | 5/1978 | Castrodale et al. | 360/99 |
| 4,458,273 | 7/1984 | Johnson | 360/69 |
| 4,563,715 | 1/1986 | Kawamura et al. | 360/78 |

FOREIGN PATENT DOCUMENTS

| | | | |
|---|---|---|---|
| 54-119902 | 9/1979 | Japan | 360/69 |
| 55-4731 | 1/1980 | Japan | 360/71 |
| 57-164473 | 10/1982 | Japan | 360/69 |
| 58-29177 | 2/1983 | Japan | 360/137 |
| 58-92166 | 12/1983 | Japan | 360/137 |

OTHER PUBLICATIONS

IBM TDB vol. 22, No. 8A "Sequential Power Connection", Dye, Jan./80, pp. 3378-3379.
Digita Design "Floppy Drive Innovations: Challenging Hard Disks", Nov. 1977, pp. 8-10.

Primary Examiner—Raymond F. Cardillo
Assistant Examiner—Steven R. Garland
Attorney, Agent, or Firm—Woodcock Washburn Kurtz Mackiewicz & Norris

[57] ABSTRACT

A floppy disk drive which, together with one or more like devices, is daisy chained to host equipment comprising a central processor unit and an associated controller. Each disk drive comprises a disk motor for rotating a record disk under the control of a disk motor drive circuit, a head motor for incrementally moving a transducer head radially of the record disk under the control of a head motor drive circuit, and a read/write circuit for processing data read from, or to be written on, the record disk via the transducer head. The host equipment produces, among other control signals, a MOTOR ON signal for the on/off control of the disk motor via the disk motor drive circuit. In order to avoid waste of electric power, not only the disk motor drive circuit but also at least one, preferably both, of the head motor drive circuit and the read/write circuit is connected to a common power line via a power control switch which is closed only when the MOTOR ON signal is in a prescribed state to cause rotation of the disk motor.

2 Claims, 13 Drawing Figures

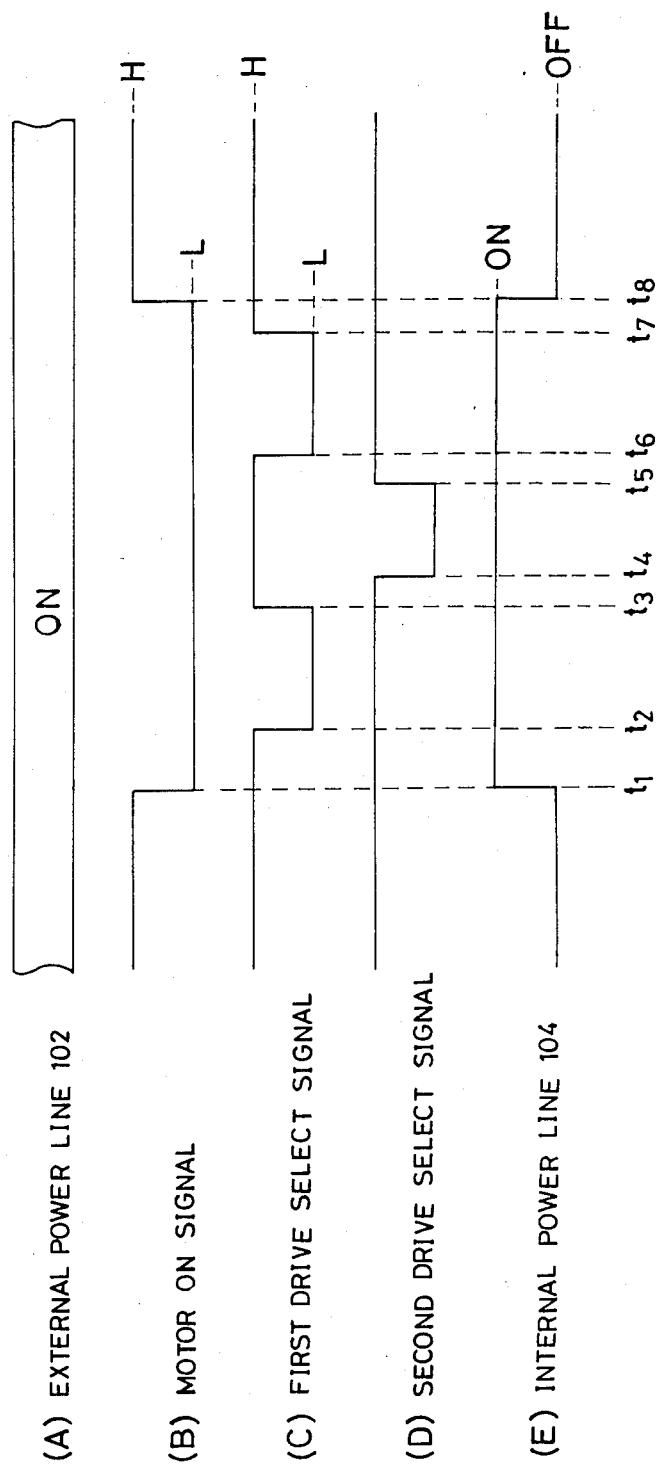

POWER SAVING CIRCUIT ARRANGEMENT FOR AN APPARATUS FOR DATA TRANSFER WITH FLEXIBLE MAGNETIC DISK OR THE LIKE

BACKGROUND OF THE INVENTION

Our invention relates to apparatus employing disklike record media for the recording and/or reproduction of data, and more specifically to apparatus for data transfer with flexible magnetic disks now commonly referred to as floppy disks, although we do not wish our invention to be unnecessarily limited to this particular type of record medium.

Floppy disks have found widespread acceptance in information processing and allied industries, as well as in offices in general, as compact data storage media. Being thin and limply flexible, the disks are usually encased in more rigid, apertured envelopes to make up disk assemblies or cartridges that are self supporting. There have also been suggested and used a variety of devices, known as floppy disk drives (FDDs), for data transfer to and from such disk cartridges. Dalziel et al. U.S. Pat. No. 3,678,481 and Castrodale et al. U.S. Pat. No. 4,089,029 represent examples of such known FDDs.

FDDs are usually not self contained; they are subservient to host equipment typically comprising a central processor unit (CPU) and an associated controller. A familiar example of such mode of use is the daisy chaining of two or more FDDs to a CPU via a controller, with the FDDs in parallel relation to each other. Each FDD intended for use with host equipment has no power switch of its own. In a data transfer system comprising a CPU, a controller, and FDDs, for example, only one power switch serves the complete system. A problem has arisen in conjunction with this standardized power supply system. The FDDs are not necessarily used for data transfer at all times after the power switch of the complete system is turned on. Conventionally, however, power has been fed to the various components of the FDDs even when they are not in actual use. This of course has incurred a substantial waste of energy.

SUMMARY OF THE INVENTION

We object to that waste of energy and hereby propose an improved data transfer apparatus that has realized a remarkable curtailment of power consumption in a simple and thoroughly practicable maner and without in any way sacrificing its operation.

According to our invention, stated in its perhaps broadest aspect, there is provided a data transfer apparatus comprising a first motor controllably driven by a first drive circuit for imparting rotation to a disklike record medium, a second motor controllably driven by a second drive circuit for moving a transducer radially of the record medium in data transfer relation therewith, and a read/write circuit connected to the transducer for processing data read from, or to be written on, the record medium. Also included are means for producing a "motor on" signal having two different prescribed states (high and low), a first prescribed state (e.g. low) for causing the first drive circuit to hold the first motor in rotation, and a second prescribed state (e.g. high) for causing the the first drive circuit to hold the first motor out of rotation. Not only the first drive circuit but also at least either (preferably both) of the second drive circuit and the read/write circuit is connected to power supply means via power control switch means which is opened and closed by the "motor on" signal. The power control switch means closes when the "motor on" signal is in the first prescribed state, and opens when the "motor on" signal is in the second prescribed state.

As will be understood, the apparatus need not perform data transfer between record medium and transducer when the "motor on" signal is in the second prescribed state and so holds the first motor, and therefore the record medium, out of rotation. Consequently, during each second prescribed state of the "motor on" signal, the first and second drive circuits and the read/write circuit need not be powered as these circuits are normally required to operate only during the progress of data transfer. Any one or more of these circuits may therefore be connected to the power supply means via the power control switch means so as to be powered only when the "motor on" signal is in the first prescribed state. Any other standard component of the apparatus that need not operate when the record medium is out of rotation may likewise be connected to the power supply means via the power control switch means. An example of such additional circuit that may be connected to the power control switch means are a "ready" circuit adapted to sense the fact that the record medium is in such a state of rotation that it is ready for data transfer.

Some components, however, should advantageously be powered even when the "motor on" signal holds the first motor out of rotation. Such components may be coupled directly to the power supply means. An example of such components is a transducer position control circuit for controlling the position of the transducer on the record medium, as the circuit includes a counter for constantly storing information indicative of the radial position of the transducer on the record medium. Another example is an interface unit if the apparatus is interfaced with host equipment.

Our invention is disclosed herein as adapted for a multiple data transfer system having a plurality of FDDs interfaced with and daisy chained to a CPU via a controller. The controller delivers the "motor on" signal to all the FDDs, each constructed as in the foregoing summary, for setting their first motors into and out of rotation. The "motor on" signal has heretofore been used for that purpose, so that our invention requires no substantial alteration of the existing parts of FDDs, or of the complete data transfer system, other than the provision of the power control switch means and associated electrical connections to attain the objectives for which it is intended.

The above and other features and advantages of our invention and the manner of realizing them will become more apparent, and the invention itself will best be understood, from a study of the following description and appended claims, with reference had to the attached drawings showing some preferable embodiments of the invention.

BRIEF DESCRIPTION OF THE DRAWINGS

FIGS. 5a–e are diagrams plotting the waveforms appearing in various parts of the FIG. 1 system, as well as the states of the power lines of that system, the diagrams being useful in explaining the operation of the data transfer system;

DESCRIPTION OF THE PREFERRED EMBODIMENTS

Figure 1:
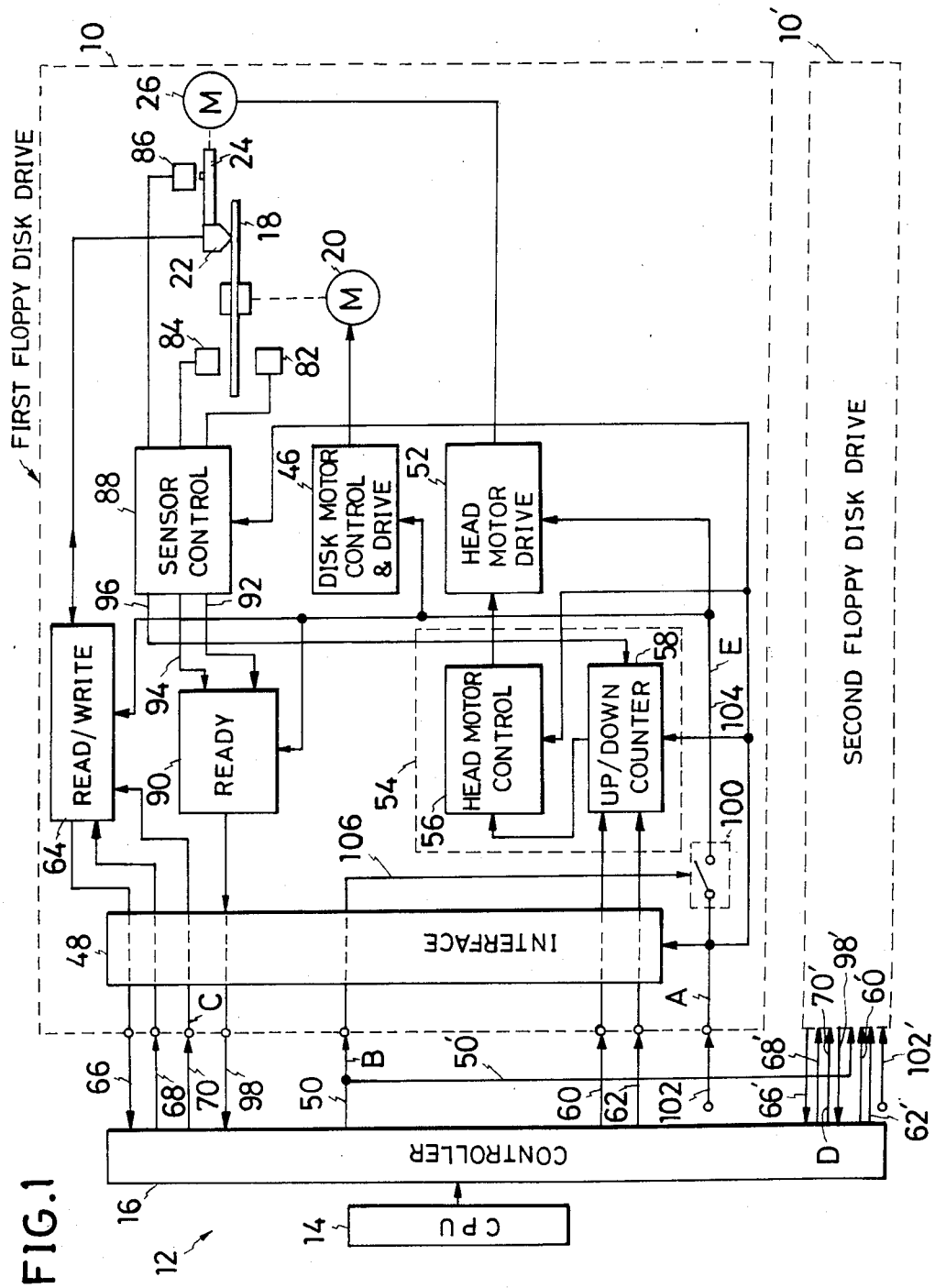
FIG. 1 is a block diagram of the data transfer system embodying the principles of our invention, with the data transfer system comprising a plurality of daisy chained FDDs each having a flexible magnetic disk cartridge loaded therein for selective data transfer.

We have illustrated in FIG. 1 the multiple data transfer system which, we believe, represents the best mode of carrying out our invention. The data transfer system comprises a plurality of, two in the illustrated embodiment, FDDs 10 and 10' daisy chained to host equipment 12 composed of a CPU 14 and a controller 16. The CPU 14 is well known in the art. The controller 16 is also a standard component of this type of data transfer system, functioning to deliver and receive signals to and from the FDDs 10 and 10' in a manner more fully set forth hereafter. Suffice it to say, therefore, that the controller 16 broadly comprises an interface of interaction with the CPU 14, a controller/formatter section, and another interface for interaction with the FDDs 10 and 10'.

The two FDDs 10 and 10' are of like construction. We will therefore describe only the first FDD 10 in detail, it being understood that the same description applies to the other FDD 10'.

The representative FDD 10 is shown to have loaded therein a replaceable floppy disk cartridge 18 having a magnetic disk for rotation by an electric motor 20. We have not illustrated the drive mechanism for imparting the rotation of this motor 20 to the magnetic disk, nor the clamp mechanism for clamping the magnetic disk against the drive mechanism, as these mechanisms are per se well known in the art and do not constitute features of our invention. Further, in order to facilitate description, we have shown the disk cartridge 18 to be single sided, rather than double sided, with only one magnetic transducer head 22 disposed on one side thereof for data transfer. The transducer head 22 is mounted to a carriage 24 for movement more or less in a radial direction of the disk cartridge 18 for track to track accessing. Employed for such radial travel of the transducer head is another electric motor 26 of the bidirectional stepping type having, for example, four phase windings to be excited in a controlled sequence to cause stepwise rotation of the rotor.

We will hereinafter refer to the first recited motor 20 as the disk motor, and to the second motor 26 as the head motor, by way of contradistinction from each other. While the disk motor 20 may directly drive the magnetic disk, the head motor 26 must of course be coupled to the head carriage 24 via a rotary to linear converter, not shown, which also is well known in the art.

Figure 2:
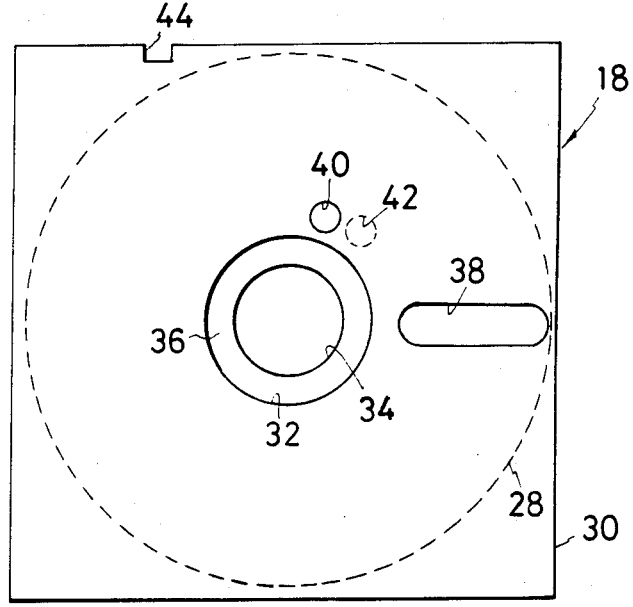
FIG. 2 is a plan view of a typical form of the flexible magnetic disk cartridge for use with each FDD of the data transfer system of FIG. 1.

Reference is now directed to FIG. 2 in order to explain a typical construction of the floppy disk cartridge 18 for use with the FDD 10. It has the aforesaid flexible magnetic disk 28 enclosed in a square envelope 30. This envelope has in each of its opposite surfaces a central aperture 32 larger than a concentric central aperture 34 in the disk 28, so that an annular portion 36 of the disk is exposed. The disk 28 is to have this exposed portion 36 clamped by the unshown clamp mechanism for rotation by the disk motor 20. The envelope 30 also has an elliptical opening 38 that serves to expose a radial portion of the disk 28. The transducer head 22 is to make data transfer contact with this exposed radial portion of the disk. Further a small hole 40 is formed through both surfaces of the envelope 30. When the disk 28 rotates within the envelope 30, an index hole 42 in the disk comes into register with the hole 40 at intervals and so allows passage of light or radiant energy to generate an electric pulse signal. A notch 44 in a marginal edge of the envelope 30 is to be masked by the user against the passage of radiant energy if the disk 28 bears information that is not to be erased inadvertently.

With reference back to FIG. 1 the disk motor 20 is connected to a disk motor control and drive circuit 46 to the controllably driven thereby. The disk motor control and drive circuit 46 includes feedback control means for holding the rotation of the disk motor 20 at a prescribed constant speed in response to an input signal representative of the actual speed of the disk motor, and drive means for energizing the disk motor under the control of the feedback control means.

The disk motor control and drive circuit 46 has conventionally been connected via an interface 48 to the controller 16 of the host equipment 12 to receive therefrom the standard MOTOR ON signal by way of a line 50. It will be seen that the line 50 has a branch line 50' connected to the second FDD 10'. Thus the MOTOR ON signal is common to all the daisy chained FDDs and has heretofore been used to set all their disk motors into and out of rotation simultaneously. In this particular embodiment of our invention, however, the disk motor control and drive circuit 46 of each FDD does not directly receive the MOTOR ON signal from the controller 16, as well as more fully explained presently.

The head motor 26 is connected to a head motor drive circuit 52 to be controllably driven thereby. If the head motor 26 is a four phase stepping motor, as we have assumed above, then the head motor drive circuit 52 may comprise four switching transistors for selectively energizing the four sets of windings of the head motor.

The head motor drive circuit 52 is itself under the control of a transducer position control circuit 54 herein shown to comprise a head motor control circuit 56 and an up/down counter 58. The head motor control circuit 56 functions to deliver four phase drive control signals to the head motor drive circuit 52 so as to cause therethrough the bidirectional, incremental rotation of the head motor 26 in a desired manner. The up/down counter 58 is connected via the interface 48 to the controller 16 to receive therefrom a DIRECTION SELECT signal and a STEP signal by way of lines 60 and 62 respectively. The DIRECTION SELECT signal determines the direction in which the transducer head 22 is to be moved by the head motor 26, that is, either radially inward or outward of the disk cartridge 18. The STEP signal represents the extent (the number of tracks) to which the transducer head 22 is to be moved in either direction. The up/down counter 58 responds to these input signals by delivering a corresponding output to the head motor control circuit 56, which in turn generates the noted four phase drive control signals accordingly, for application to the head motor drive circuit 52.

The transducer head 22 is connected to a read/write circuit 64. As the present data transfer system is equipped for both introduction and recovery of data to and from the disk cartridges, the read/write circuit 64 functions to direct the data read by the transducer head 22 to the controller 16 via the interface 48 and a line 66, and to send the data to be written, delivered from the controller by way of a line 68, on to the transducer head. The read/write circuit 64 is further connected via the interface 48 to the controller 16 by way of another line 70 to input a DRIVE SELECT signal. The DRIVE SELECT signal controls the passage of the outgoing and incoming data through the read/write circuit 64 in a manner that will become apparent from the following description of FIG. 3.

Figure 3:
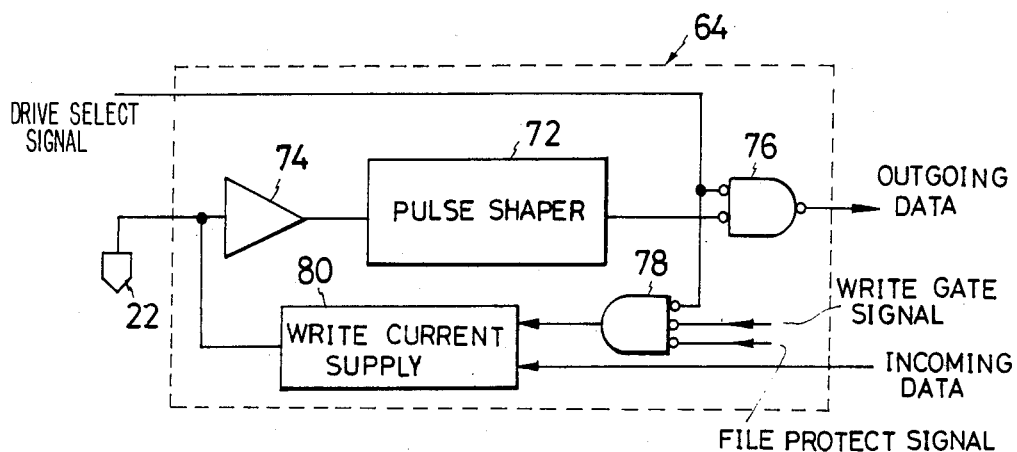
FIG. 3 is a block diagram showing in greater detail the read/write circuit in each FDD of the data transfer system of FIG. 1.

FIG. 3 is a more detailed, although still somewhat schematic, illustration of the read/write circuit 64. Included in this circuit is a pulse shaper 72 connected to the transducer head 22 via a read amplifier 74. The data recovered from the disk cartridge by the transducer head 22 is amplified by the read amplifier 74, and the amplified replica of the recovered data enters the pulse shaper 72 thereby to be shaped into a form suitable for further processing. Connected downstream of the pulse shaper 72 is an AND type OR gate 76, having another input connected to receive the DRIVE SELECT signal from the controller output line 70 via the interface 48. The output of this OR gate is connected via the interface 48 to the controller input line 66.

Consequently the OR gate 76 allows the passage of the recovered data therethrough, toward the controller 16, only when the DRIVE SELECT signal is low. The OR gate 76 may therefore be called a data select gate.

Also included in the read/write circuit 64 is another data select gate in the form of an AND type NOR gate 78 designed to control the passage through the circuit 64 of data to be written on the disk cartridge 24. The NOR gate 78 has three inputs, one for receiving the DRIVE SELECT signal from the controller 16 by way of its output line 70, another input for receiving a WRITE GATE signal from the controller 16, and still another for receiving an internally generated FILE PROTECT signal. The WRITE GATE signal goes low when the data already written on the disk may be erased for the introduction of new data. The FILE PROTECT signal, on the other hand, goes high when the notch 44, FIG. 2, in the disk cartridge envelope 30 is masked against the passage of radiant energy to inhibit the erasure of the recorded data. The output of the NOR gate 78 is connected to a write current supply circuit 80, to which there is also connected via the interface 48 the controller output line 68 for the delivery of the data to be written. The output of the write current supply circuit 80 is connected directly to the transducer head 22.

Thus the output from the NOR gate 78 goes high when its three input signals, the DRIVE SELECT signal, WRITE GATE signal, and FILE PROTECT signal, all go low. This high output enables the write current supply circuit 80 to deliver a write current, representative of the desired data to be written on the disk, to the transducer head 22.

Referring again to FIG. 1, we will now describe several sensor assemblies and associated circuit means included in the FDD 10. At 82 is shown an index sensor assembly for sensing the angular position of the magnetic disk 28, FIG. 2, from the index hole 42 moving into and out of register with the hole 40 in the disk envelope 30. A disk sensor assembly 84 senses the presence or absence of the disk cartridge 18 in a preassigned data transfer position within the FDD. A head sensor assembly 86 senses from the position of the head carriage 24 the position of the transducer head 22 in the radial direction of the magnetic disk. The index sensor assembly 82, disk sensor assembly 84, and head sensor assembly 86 can all be conventional photoelectric sensing assemblies, each comprising a light source such as a light emitting diode and a photosensor such as a phototransistor.

The three sensor assemblies 82, 84 and 86 named above are all electrically connected to a sensor control circuit 88. Among the functions of this sensor control circuit is the supply of electric current to the light sources of the sensor assemblies 82, 84 and 86. The sensor control circuit 88 further responds to the electric outputs from the photosensors of the sensor assemblies 82, 84 and 86 by producing an index signal, disk presence signal, and head position signal. The index signal and disk presence signal, indicative respectively of the angular position of the magnetic disk and of the presence or absence of the disk cartridge in the data transfer position, are both delivered to a "ready" circuit 90 by way of lines 92 and 94. The head position signal, representative of the radial position of the transducer head 22 on the magnetic disk, is applied to the up/down counter 58 of the transducer position control circuit 54 by way of a line 96. Although not illustrated, a "file protect" sensor assembly is assumed to be provided in the vicinity of the data transfer position of the disk cartridge 18. As the name implies, the "file protect" sensor assembly senses from the notch 44, FIG. 2, in the disk cartridge envelope 30 whether data may be written on the disk or not. The output from the "file protect" sensor assembly is utilized as above stated for controlling the operation of the read/write circuit 64 as the FILE PROTECT signal.

The "ready" circuit 90 determines, from the index signal and disk presence signal fed from the sensor control circuit 88, whether or not the magnetic disk is ready for the commencement of writing or reading. A READY output signal of the circuit 90, conveying this information, is directed via the interface 48 to the controller 16 by way of a line 98.

The reference numeral 100 in FIG. 1 denotes a power control switch constituting a feature of our invention. The power control switch 100 is connected between an external power line 102 conducting electric power to the FDD 10 and an internal power line 104 leading to some selected components of the FDD. The power control switch 100 further has an actuating signal line 106 connected to the controller output line 50 via the interface 48, in order to be turned on and off by the MOTOR ON signal. Connected to a supply circuit, not shown, serving the complete data transfer system, the external power line 102 applies a prescribed working voltage to the FDD 10 when the power switch, also not shown, of the system is turned on. We have herein shown the internal power line 104 connected to the disk motor control and drive circuit 46, head motor drive circuit 52, head/write circuit 64, and "ready" circuit 90. All these circuits 46, 52, 64, and 90 are therefore powered on and off by the power control switch 100. It will also be noted that the external power line 102 is connected directly to the interface 48, the head motor control circuit 56 and up/down counter 58 of the head position control circuit 54, and the sensor control circuit 88. These circuits 48, 56, 58 and 88 are therefore unaffected by the power control switch 100.

Figure 4:
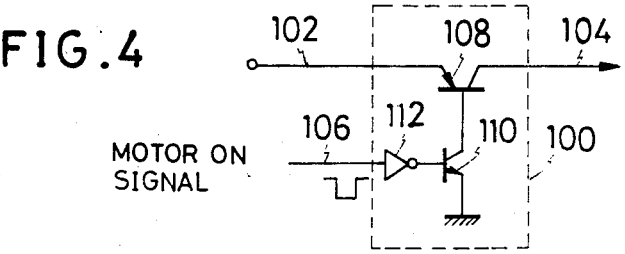
FIG. 4 is a schematic electrical diagram showing in detail a practical example of the power control switch build into each FDD of the FIG. 1 system in accordance with our invention.

FIG. 4 shows an example of construction the power control switch 100 may take in practice. A switching transistor 108 is connected between external power line 102 and internal power line 104. For the on/off control of this transistor 108 another transistor 110 is connected between the base of the first recited transistor and ground. The second transistor 110 has its base connected to the signal line 106 to be actuated by the MOTOR ON signal. The power control switch 100 must close when the MOTOR ON signal is low in the illustrated embodiment. Employed to this end is a NOT circuit 112 which functions to invert the MOTOR ON signal before its application to the second transistor 110. Thus, whenever the MOTOR ON signal goes low, the second transistor 110 becomes conductive and so causes conduction through the first transistor 108 for the application of the supply voltage to the circuits 46, 52, 64, 88 and 90.

We have so far described the construction of the first FDD 10, which is interfaced with the controller 16 via the signal lines 50, 60, 62, 66, 68, 70 and 90. An additional line, not shown, connects the controller 16 to the FDD 10 for the delivery of the noted WRITE GATE signal to the NOR gate 78, FIG. 3, of the read/write circuit 64. The data transfer system of this type usually has still another line, also not shown, for the delivery of an IN USE signal to each FDD, the IN USE signal being indicative of the fact that the FDD is in use for data transfer.

The second FDD 10' is likewise interfaced with the controller 16 via lines 50', 60', 62', 66', 68', 70', 90', etc., similar to those between first FDD 10 and controller 16. At 102' is shown an external power line connected to the second FDD 10'.

Operation

In the following operational description of the data transfer system, configured as in the foregoing, we will refer to the waveform diagram of FIG. 5. Depicted in this figure are, from top to bottom:

(A) The state of the external power line 102 connected to the first FDD 10.

(B) The common MOTOR ON signal applied from the controller 16 to the disk motor control and drive circuits 46 of both FDDs 10 and 10'.

(C) The first DRIVE SELECT signal applied from the controller to the read/write circuit 64 and power control switch 100 of the first FDD 10.

(D) The second DRIVE SELECT signal applied from the controller to the read/write circuit and power control switch of the second FDD 10'.

(E) The state of the internal power line 104 of the first FDD 10.

We have further indicated in FIG. 1 the lines where the waveforms of FIG. 5 appear, by the associated letters (A) through (E). Reference may therefore be had to both FIGS. 1 and 5, unless otherwise notified, for a better understanding of the operational description.

The external power line 102 conducts power to the first FDD 10, as at (A) in FIG. 5, as the unshown power switch of the data transfer system is closed after the disk cartridge 18 has been loaded in the FDD and clamped in position therein. However, as long as the power control switch 100 in accordance with our invention is held open, the supply voltage will be impressed only to the interface 48, head motor control circuit 56, up/down counter 58 and sensor control circuit 88 of the FDD 10, and not to the disk motor control and drive circuit 46, head motor drive circuit 52, read/write circuit 64, and "ready" circuit 90, thereby saving power.

The transducer head 22 must be returned to the "track zero" position on the magnetic disk of the loaded disk cartridge 18 upon closure of the system power switch. To make this possible the MOTOR ON signal goes low and is held in that state for a certain length of time, with the consequent closure of the power control switch 100 during the same length of time. As the transducer head 22 returns to track zero, through the procedure that is routine in this type of apparatus, the sensor control circuit 88 senses that position of the transducer head from the output from the head sensor assembly 86 and further operates to reset the up/down counter 58 of the head position control circuit 54 via the line 96. The MOTOR ON signal goes high following the return of the transducer head 22 to the "track zero" position and the subsequent resetting of the up/down counter 58.

Thereafter, as at (B) in FIG. 5, the MOTOR ON signal is shown to go low at a moment t1. Thereupon the power control switch 100 becomes closed to allow energization of the disk motor drive and control circuit 46 by way of the internal power line 104, as at (E) in FIG. 5. Thereupon the disk motor 20 starts rotation. The head motor drive circuit 52 also becomes powered to energize the head motor 26 under the control of the head position control circuit 54. The closure of the power control switch 100 results further in the energization of the read/write circuit 64, and "ready" circuit 90.

The MOTOR ON signal is shown at (B) in FIG. 5 to remain low from moment t1 to moment t8, holding the power control siwtch 100 closed throughout the same period. Further, at (C) in FIG. 5, the first DRIVE SELECT signal for the FDD 10 is shown to be low from moment t2 to moment t3 and from moment t6 to moment t7. When the first DRIVE SELECT signal goes low as above, the outgoing data select gate 76 of the read/write circuit 90 becomes conditioned to allow the passage of the recovered data. The incoming data select gate 78 of the read/write circuit 90 also becomes conditioned to allow the passage of the data to be written, provided that the WRITE GATE signal and FILE PROTECT signal are both low. Thus, during the periods from moment t2 to moment t3, and from moment t6 to t7, the writing or reading of data on or from the disk cartridge loaded in the fist FDD 10 is possible in the same way as heretofore.

The second DRIVE SELECT signal, on the other hand, is shown to be low from moment moment t4 to moment t5. The MOTOR ON signal is common to both FDDs 10 and 10', so that the power control switch of the second FDD is also held closed from moment t1 to moment t8. Data transfer may therefore be effected in the second FDD 10' during the low period of the second DRIVE SELECT signal as heretofore.

As the common MOTOR ON signal goes high at the moment t8, the power control switch 100 re-opens to disconect the internal power line 104 from the external power line 102. Since the power switch of the complete data transfer system is still assumed to be closed, power is saved again by re-opening the power control switch 100 when the MOTOR ON signal goes high. However, despite the opening of the power control switch 100, the up/down counter 58 of the head position control circuit 54 is held energized, being connected directly to the external power line 102, and so retains the information representative of the radial position of the transducer head 22 on the magnetic disk of the cartridge 18. Consequently, if the MOTOR ON signal subsequently goes low again, the transducer head need not be returned to the "track zero" position on the magnetic disk for recalibration, making possible the immediate recommencement of data transfer between disk and head.

Although we have already set forth the advantages gained by our invention, we may restudy in further detail the particular advantages of the illustrated data transfer system after having thus fully disclosed its construction and operation. The advantages are:

1. The power consumption of each FDD, while it is standing by for data transfer with the power switch of the complete system closed, can be reduced to approximately one third that of the prior art. This power saving capability manifests itself as an even greater advantage when the invention is applied to battery powered systems.
2. The power control switch 100 does not require manual activation, nor is the provision of any particular switch activating means necessary other than the signal line 106.
3. Once the transducer head is returned to the "track zero" position on the magnetic disk when the system power switch is initially closed, the head position is constantly held in storage in the counter of the head position control circuit in spite of subsequent changes in the state of the MOTOR ON signal. Thus, whenever the MOTOR ON signal goes low during the complete period when the system switch is held closed, reading or writing can be recommenced with little or no delay. The information stored in the counter of the head position control circuit is used further for controlling the write current in accordance with the radial position of the transducer head on the magnetic disk, and for the selective use of the filter for the removal of the unnecessary frequency component from the data being read out.

Second Form

Figure 6:
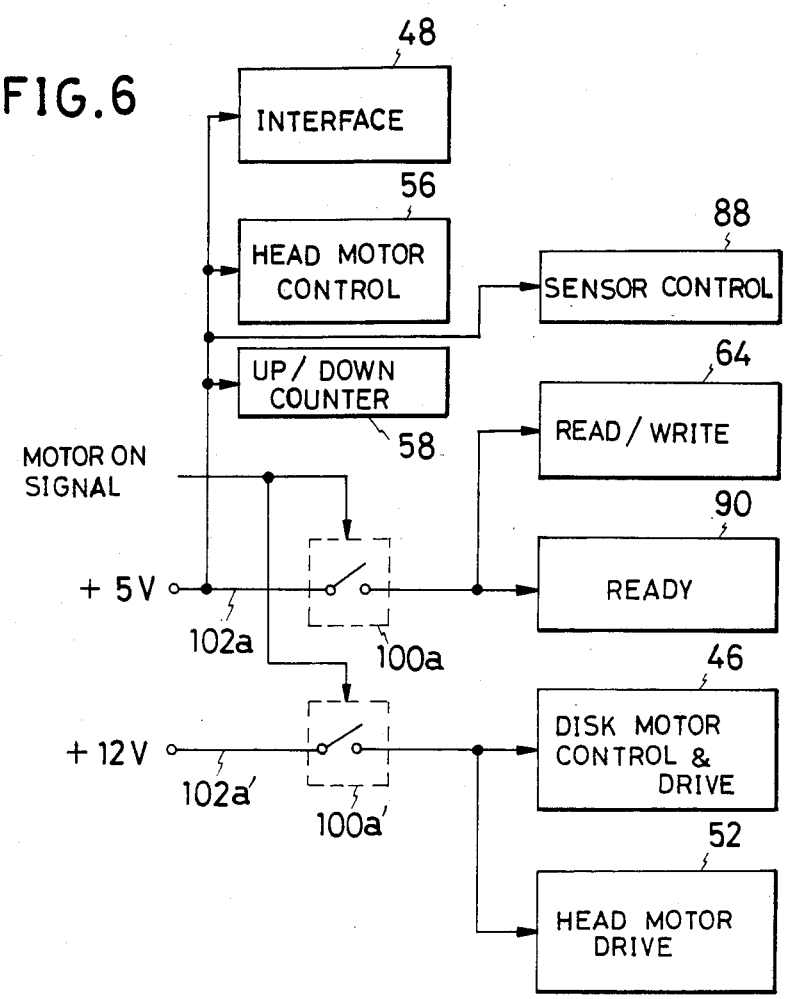
FIG. 6 is a block diagram showing part of a slight modification of each FDD of the FIG. 1 system.

In FIG. 6 is show our invention as adapted for a data transfer system having two separate external power lines 102a and 102a' for the application of different supply voltages to each FDD. The first power line 102a is intended for the application of a five volt supply voltage to the interface 48, head motor control circuit 56, counter 58, sensor control circuit 8, read/write circuit 64, and "ready" circuit 90. The second power line 102a' is intended for the application of a 12 volt supply voltage to the disk motor control and drive circuit 46 and head motor drive circuit 52.

In this application we suggest the provision of a first power control switch 100a between the first power line 102a and the read/write circuit 64 and "ready" circuit 90, and of a second power control switch 100a' between the second power line 102a' and the disk motor control and drive circuit 46 and head motor drive circuit 52. As taught by the FIG. 1 embodiment, the interface 48, head motor control circuit 56, counter 58, and sensor control circuit 88 are all connected directly to the first power line 102a. The two power control switches 100a and 100a' can each be constructed as in FIG. 4 and are to close in response to the low state of the MOTOR ON signal. The other details of construction and operation are substantially as set forth above in connection with FIGS. 1 through 5.

Third Form

Figure 7:
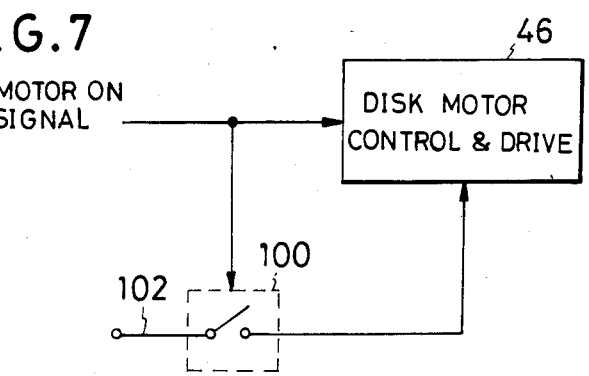
FIG. 7 is also a block diagram showing part of another slight modification of each FDD of the FIG. 1 system.

FIG. 7 shows another slight modification of the FIG. 1 embodiment, wherein the disk motor drive and control circuit 46 is connected to directly receive the MOTOR ON signal from the controller output line 50, besides being connected to the power control switch 100. The MOTOR ON signal will then function to cause the disk motor drive and control circuit 46 to make on/off control of the disk motor.

Fourth Form

Figure 8:
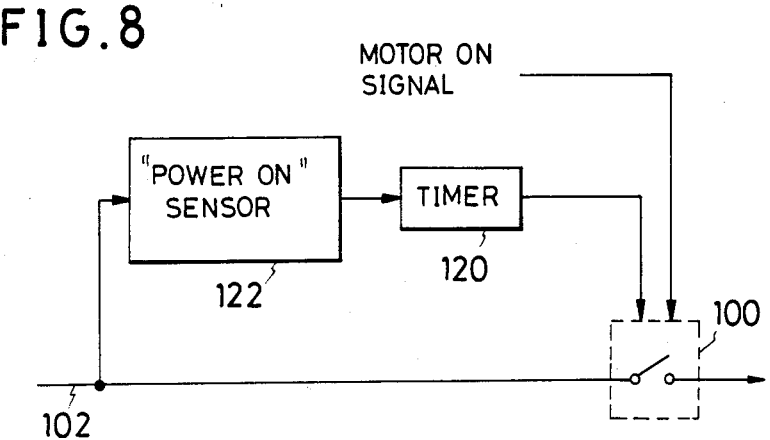
FIG. 8 is also a block diagram showing part of still another still modification of each FDD of the FIG. 1 system.

In still another modification of the FIG. 1 embodiment shown in FIG. 8, the power control switch 100 is actuated not only by the MOTOR ON signal but also by an output from a timer 120 which in turn is responsive to an output from a "power on" sensor circuit 122. Connected to the external power line 102, the "power on" sensor circuit 122 triggers the timer 120 upon closure of the unshown power switch of the data transfer system. The output from the timer 120 goes low, for instance, on triggering and remains in that state for a predetermined length of time thereafter, resulting in the closure of the power control switch 100 during the same period.

Connected to the power control switch 100, the head motor drive circuit 52 will be powered immediately upon closure of the system power switch to enable the return of the transducer head to the "track zero" position on the magnetic disk. The timer output itself may also be used for the return of the transducer head to the initial position.

Fifth Form

Figure 9:
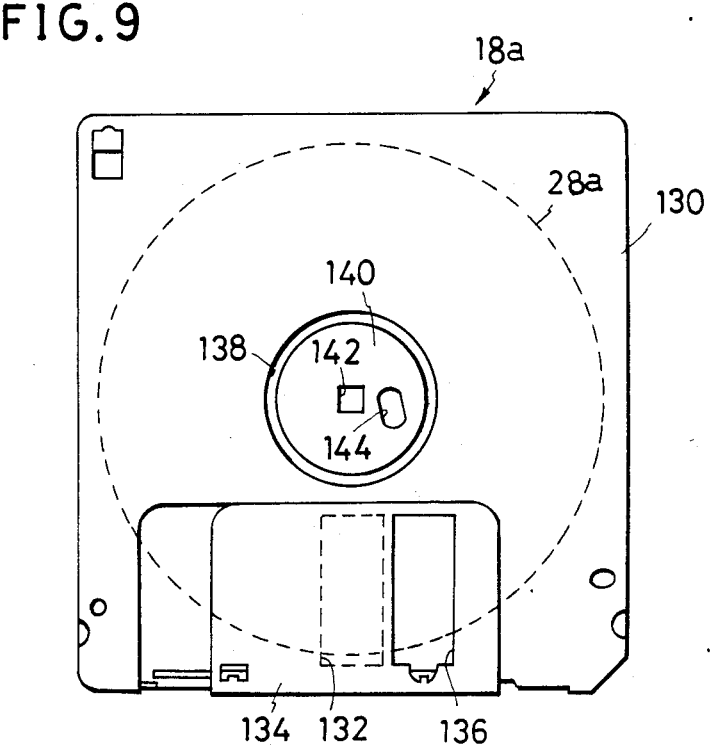
FIG. 9 is a plan view of another example of record medium suitable for use with the data transfer apparatus of our invention.

FIG. 9 illustrates another preferred form of record medium that may be employed in substitution for the disk cartridge 18 of FIG. 2 with the data transfer apparatus of our invention. Generally designated 18a, the alternative record medium also has a flexible magnetic disk 28a, with a diameter of approximately 3.5 inches (86 millimeters), housed in an envelope 130 which is molded of synthetic resin material and which has greater rigidity than the envelope 30 of the disk cartridge 18. The envelope 130 has a slot 132 formed in at least one side thereof to expose a radial portion of the disk 28a for the data transfer with the transducer head. The slot 132 is normally closed by a slidable cover 134, itself having a slot 136 formed therein, on the envelope 130. The cover 134 is sprung and normally held in the illustrated position on the envelope 130, with the slot 136 therein out of register with the slot 132 in the cover.

In use, then, the cover 134 is slid over the envelope 130 against the spring pressure to bring the slot 136 into register with the slot 132.

The envelope 130 has further formed therein a central aperture 138 to expose a central portion of the magnetic disk 28a. This disk has a rigid hub 140 at its exposed central portion. In the form of a metal disk, the hub 140 is to be magnetically attached to a drive hub, not shown, of the data transfer apparatus. The hub 140 has formed therein a central square opening 142 and an eccentric elliptical opening 144 for the insertion of a spindle and drive pin, both not shown, of the data transfer apparatus.

Possible Modifications

Although we have shown and described our invention in terms of specific embodiments thereof and as adapted for a system having a plurality of daisy chained FDDs, it is understood that these are by way of example only and not to impose limitations upon the invention. A variety of modifications or alterations will occur to one skilled in the art to conform to design preferences or to specific requirements of the applications of the invention. For example, the sensor control circuit 88 might be connected to the power supply via the power control switch 100 or 100a, instead of being connected directly to the power supply as in the FIG. 1 or 6 embodiment. The head motor control circuit 56 and counter 58 might also be connected to the power supply via the power control switch 100 or 100a. In short, according to the broadest aspect of our invention, any desired one or more of the pertinent components of the data transfer apparatus, in addition to the disk motor control and drive circuit 46, may be connected to the power supply via the power control switch. It is therefore appropriate that our invention be construed broadly and in a manner consistent with the fair meaning or proper scope of the following claims.

We claim:

1. A data transfer apparatus for use within a disklike record medium such as a flexible magnetic disk, the apparatus comprising:
    (a) a first motor for imparting rotation to the record medium;
    (b) a first drive circuit for controllably driving the first motor;
    (c) a transducer arranged for data transfer with the record medium;
    (d) a second motor for moving the transducer radially of the record medium;
    (e) a second drive circuit for controllably driving the second motor;
    (f) a read/write circuit connected to the transducer for processing data transferred between the transducer and the record medium;
    (g) means for supplying a "motor on" signal for the on/off control of the first motor via the first drive circuit, the "motor on" signal having a first prescribed state for holding the first motor in rotation and a second prescribed state for holding the first motor out of rotation;
    (h) power supply means;
    (i) power control switch means connected between the power supply means and the first drive circuit, the second drive circuit and the read/write circuit; the first drive circuit, the second drive circuit and the read/write circuit being connected to the power supply means via the power control switch means, the power control switch means being adapted to be closed when the "motor on" signal is in the first prescribed state and to be opened when the "motor on" signal is in the second prescribed state;
    (j) a counter for storing information indicative of the position of the transducer in a radial direction of the record medium, for controlling the second motor via the second drive circuit, the counter being connected directly to the power supply means;
    (k) a sensor control circuit for sensing the angular position of the record medium, the sensor circuit being connected directly to the power supply means; and
    (l) a "ready" circuit responsive to an output from the sensor control circuit for sensing the fact that the record medium is ready for data transfer, the "ready" circuit being connected to the power supply means via the power control switch means;
    (m) whereby the second drive circuit and the read/write circuit are supplied with electric power from the power supply means via the power control switch means only when the first drive motor is in rotation.

2. A data transfer apparatus for use within a disklike record medium such as a flexible magnetic disk, the apparatus comprising:
    (a) a first motor for imparting rotation to the record medium;
    (b) a first drive circuit for controllably driving the first motor;
    (c) a transducer arranged for data transfer with the record medium;
    (d) a second motor for moving the transducer radially of the record medium;
    (e) a second drive circuit for controllably driving the second motor;
    (f) a read/write circuit connected to the transducer for processing data transferred between the transducer and the record medium;
    (g) means for supplying a "motor on" signal for the on/off control of the first motor via the first drive circuit, the "motor on" signal having a first prescribed state for holding the first motor in rotation and a second prescribed state for holding the first motor out of rotation;
    (h) a first power supply means for applying a first supply voltage to the first and second drive circuits;
    (i) a second power supply means for applying a second supply voltage, different from the first supply voltage, to the read/write circuit;
    (j) a first power control switch connected between the first power supply means and the first and second drive circuits;
    (k) a second power control switch connected between the second power supply means and the read/write circuit;
    (l) a counter for storing information indicative of the position of the transducer in a radial direction of the record medium, for controlling the second motor via the second drive circuit, the counter being connected directly to the second power supply means; and
    (m) whereby the first and second power control switches are adapted to be closed when the "motor on" signal is in the first prescribed state and to be opened when the "motor on" signal is in the second prescribed state, and where the second drive circuit is supplied with electric power from the first power supply means via the first power control switch means only when the first drive motor is in rotation and the read/write circuit is supplied with electric power from the second power supply means via the second power control switch means only when the first drive motor is in rotation.

* * * * *